United States Patent
Liu et al.

(10) Patent No.: US 8,871,007 B2
(45) Date of Patent: Oct. 28, 2014

(54) REDUCTION OF MERCURY EMISSIONS FROM CEMENT PLANTS

(75) Inventors: Xin Liu, Baton Rouge, LA (US); Jon E. Miller, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 22 days.

(21) Appl. No.: 13/695,659

(22) PCT Filed: Apr. 27, 2011

(86) PCT No.: PCT/US2011/034180
§ 371 (c)(1),
(2), (4) Date: Jan. 3, 2013

(87) PCT Pub. No.: WO2011/139789
PCT Pub. Date: Nov. 10, 2011

(65) Prior Publication Data
US 2013/0104734 A1    May 2, 2013

Related U.S. Application Data

(60) Provisional application No. 61/331,219, filed on May 4, 2010.

(51) Int. Cl.
*B01D 53/02* (2006.01)
*B01J 20/02* (2006.01)
*C04B 7/36* (2006.01)
*B01J 20/20* (2006.01)
*B01D 53/10* (2006.01)
*C04B 14/00* (2006.01)

(52) U.S. Cl.
CPC .......... *C04B 14/00* (2013.01); *B01D 2253/102* (2013.01); *B01J 20/027* (2013.01); *C04B 7/364* (2013.01); *B01J 20/20* (2013.01); *B01D 2257/602* (2013.01); *B01D 53/10* (2013.01)
USPC .............. 95/134; 95/107; 110/203; 110/345; 423/210

(58) Field of Classification Search
CPC .. B01D 53/10; B01D 53/64; B01D 2253/102; B01D 2257/602; B01J 20/027; C04B 7/364; F23J 2215/60
USPC .............. 95/107, 134; 110/203, 345; 423/210
See application file for complete search history.

(56) References Cited

U.S. PATENT DOCUMENTS

| 1,984,164 | A | 12/1934 | Alfred |
| 4,500,327 | A | 2/1985 | Nishino et al. |
| 5,827,352 | A * | 10/1998 | Altman et al. ................. 95/58 |
| 5,900,042 | A | 5/1999 | Mendelsohn et al. |
| 6,514,907 | B2 | 2/2003 | Tsutsumi et al. |

(Continued)

FOREIGN PATENT DOCUMENTS

| DE | 102007005788 A1 | 8/2008 |
| JP | 2002284550 A | 10/2002 |

(Continued)

*Primary Examiner* — Christopher P Jones
(74) *Attorney, Agent, or Firm* — Marcy M. Hoefling

(57) ABSTRACT

This invention provides a method for reducing mercury emissions from a cement plant comprising at least a particulate collection device and a preheater tower comprised of one or more preheater cyclones. The method comprises injecting pulverized coal into at least one preheater cyclone of said cement plant.

9 Claims, 2 Drawing Sheets

(56) References Cited

U.S. PATENT DOCUMENTS

| | | |
|---|---|---|
| 6,521,021 B1 * | 2/2003 | Pennline et al. ............... 95/134 |
| 6,808,692 B2 | 10/2004 | Oehr |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 6,953,494 B2 * | 10/2005 | Nelson, Jr. ............... 95/134 |
| 2002/0114749 A1 | 8/2002 | Cole |
| 2005/0039598 A1 | 2/2005 | Srinivasachar et al. |
| 2006/0204418 A1 | 9/2006 | Chao et al. |
| 2006/0205592 A1 | 9/2006 | Chao et al. |
| 2007/0051239 A1 | 3/2007 | Holmes et al. |
| 2007/0140940 A1 | 6/2007 | Varma et al. |
| 2007/0179056 A1 * | 8/2007 | Baek et al. ............... 502/400 |
| 2007/0180990 A1 | 8/2007 | Downs et al. |
| 2007/0254807 A1 | 11/2007 | Bisque et al. |
| 2009/0193968 A1 * | 8/2009 | Jepsen et al. ............... 95/134 |
| 2010/0000406 A1 * | 1/2010 | Schwab et al. ............... 95/41 |
| 2010/0316546 A1 * | 12/2010 | Paone, III ............... 423/215.5 |

FOREIGN PATENT DOCUMENTS

| | | |
|---|---|---|
| JP | 2002355531 A | 12/2002 |
| JP | 2003192407 A | 7/2003 |
| JP | 2006045006 A | 2/2006 |
| WO | 2009107620 A1 | 9/2009 |

* cited by examiner

US 8,871,007 B2

1

REDUCTION OF MERCURY EMISSIONS FROM CEMENT PLANTS

REFERENCE TO RELATED APPLICATIONS

This application is the National Stage of International Patent Application PCT/US2011/034180, filed on Apr. 27, 2011, which application claims priority from U.S. Application No. 61/331,219, filed May 4, 2010, the disclosures of which are incorporated herein by reference.

TECHNICAL FIELD

This invention relates to reduction of mercury emissions from cement plants.

BACKGROUND

Research into sources of mercury emissions in the U.S. has resulted in the identification of cement producing facilities as significant emission source of mercury. Currently, cement plants are the fourth largest source of mercury emissions in the U.S. The U.S. Environmental Protection Agency (EPA) has proposed a rule to limit mercury emissions from cement plants. The proposed rule sets forth the first limits on mercury emissions from existing cement plants and strengthens the limits for new plants. The proposed rule sets mercury emission limits for existing sources at 26 pounds of mercury per million tons of feed (~13 kg/million tons) or 43 pounds of mercury per million tons of clinker produced (~21.5 kg/million tons). For new cement plants, the mercury emission limit is 14 pounds of mercury per million tons of clinker produced (~7.0 kg/million tons). The proposed rule is set to take effect in 2013. The EPA estimates that when the rule is fully implemented, annual emissions of mercury from cement plants will be reduced by at least 81%.

It is known that activated carbon can be injected into a gas stream containing mercury vapor. When mercury vapor contacts activated carbon particles, the mercury is captured and held by the activated carbon particles. The particles are then collected by a particulate collection device, such as an electrostatic precipitator or a baghouse filter.

Relatively inexpensive and yet effective ways to reduce mercury emissions from cement plants are quite desirable.

SUMMARY OF THE INVENTION

This invention provides methods for reducing the emissions of mercury at low cost. The methods provided herein can be easily incorporated into existing cement plants without requiring extensive reconfiguration.

An embodiment of this invention is a method for reducing mercury emissions from a cement plant comprising at least a particulate collection device and a preheater tower comprised of one or more preheater cyclones. The method comprises injecting pulverized coal into at least one preheater cyclone of said cement plant.

These and other embodiments and features of this invention will be still further apparent from the ensuing description, drawings, and appended claims.

2

Figure 3:
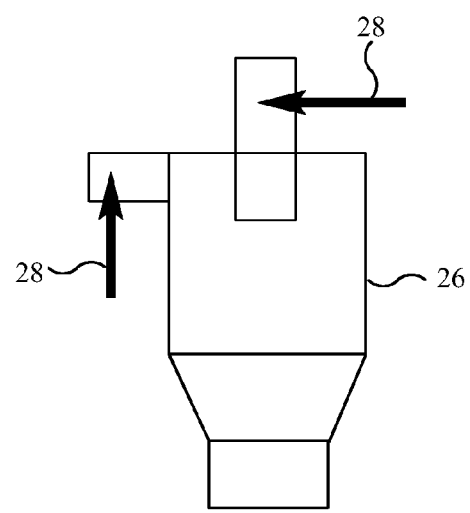

FIG. 3 is a schematic diagram of a typical preheater cyclone of a cement plant.

FURTHER DETAILED DESCRIPTION OF THE INVENTION

Figure 1:
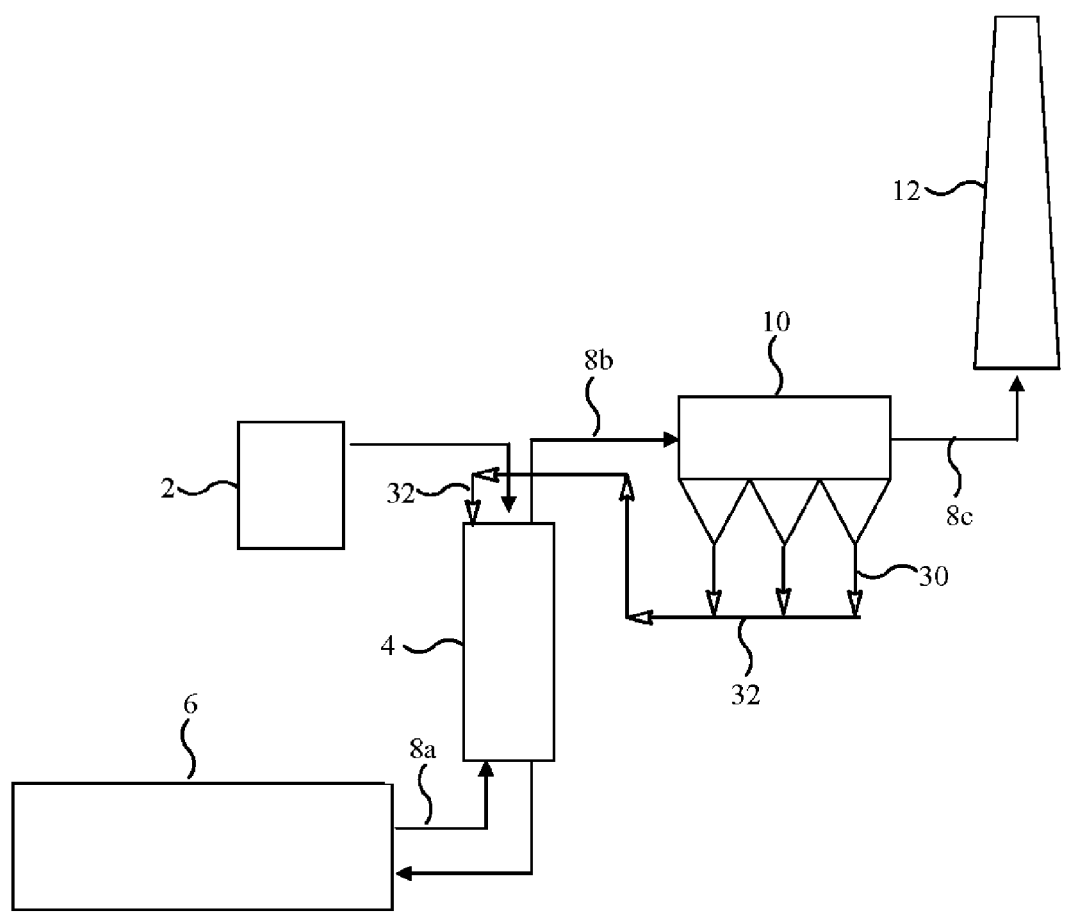
FIG. 1 is a schematic diagram of a generalized cement plant configuration.

The configurations of cement plants vary, but have several features in common. A generalized cement plant configuration showing pertinent parts is shown in FIG. 1. In cement plants having a raw material mill and a preheater tower, material from the raw material mill 2 (raw mill) is fed to the top of the preheater tower 4 (sometimes called a precalciner tower) and from the preheater tower 4 into the kiln 6. Clinker is produced in the kiln, and is discharged from the kiln. A gas stream 8a exits from the kiln 6. The gas stream 8a enters the bottom of the preheater tower 4 and exits from the top of the preheater tower 4. The gas stream 8b is then cooled, usually by water, often in a conditioning tower. When the raw mill 2 is operating, the cooled gas stream 8b is recycled to the raw mill 2; when the raw mill is not operating, the cooled gas stream 8b instead travels to a particulate collection device 10. After passing through the particulate collection device 10, the gas stream 8c exits the cement plant by traveling through the stack 12. For recirculation of the particulates collected by the particulate collection device 10, three lines 30 for the exit of the particulates are shown; also shown is a recirculation line 32 for the return of the particulates to the preheater tower 4.

The Figures are not intended to be construed as limiting the invention. For example, the present invention applies to cement plants that do not have a raw material mill, as well as to cement plants that do have a raw material mill.

In the embodiments of this invention, the pulverized coal can be from a source external to the cement plant. Alternatively, the pulverized coal can be from the coal baghouse, if the coal is pulverized onsite at the cement plant.

In the methods of this invention, the pulverized coal is injected into one or more of the preheater cyclones that make up the preheater tower. Recommended injection points vary with the coal type, coal particle size, volatile and moisture content of the coal, oxygen level, and the like. For example, in the high temperature zones of the preheater tower (in range of about 400° C. to about 800° C.), moisture and volatiles of fine particles of the coal are released, and more pores and more surface area are formed in the fine particles of coal.

Figure 2:
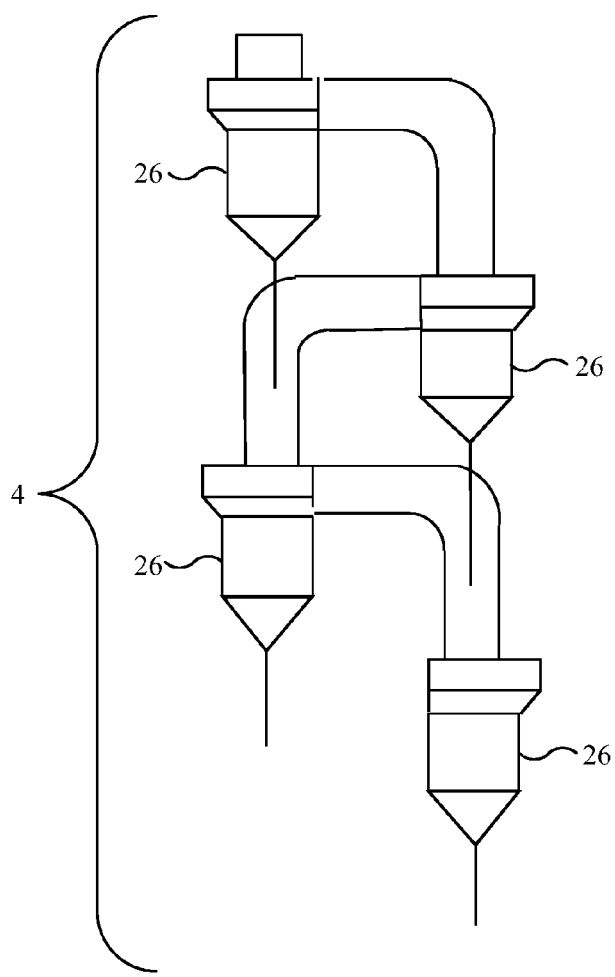
FIG. 2 is a schematic diagram of a typical preheater tower of a cement plant.

A typical preheater tower of a cement plant is shown in FIG. 2. A preheater tower 4 is comprised of one or more preheater cyclones 26, also called particulate cyclones. There is usually a series of several preheater cyclones, normally from three to about seven preheater cyclones in a preheater tower. FIG. 2 shows a series of preheater cyclones 26 that make up a preheater tower 4. As described above, the pulverized coal can be injected into one or more preheater cyclones; the preferred cyclone(s) for injection of the pulverized coal depend on the characteristics of the coal being injected.

FIG. 3 shows a typical preheater cyclone 26 of a cement plant. Arrows 28 indicate possible injection points for the pulverized coal into the preheater cyclone 26.

A preferred way of operating is to inject water into at least one preheater cyclone of the cement plant, so that the pulverized coal, at least in part, undergoes steam activation. Preferably, the water is injected with the pulverized coal; more preferably, the pulverized coal is mixed with water, and the mixture of water and pulverized coal is injected.

In the practice of this invention, the reduction of mercury emissions employs pulverized coal. Without wishing to be bound by theory, it is believed that the pulverized coal comes into contact with mercury and/or mercury-containing compounds, which are then absorbed by the pulverized coal. The fine particles of the pulverized coal travel from the injection point in the preheater tower via the gas stream vent of the preheater cyclone, and are collected, along with other particulates, in the particulate collection device of the cement plant. From the particulate collection device, the pulverized coal (and other particulates collected) can be recirculated through the plant. In such recirculation, the particulates are usually sent initially to the preheater tower.

It is noted that the pulverized coal is comprised of particles of various sizes. In the preheater tower, the fine particulates flow with the gas stream out of the preheater tower and ultimately to the particulate collection device. Large-sized particles of coal travel out of the preheater tower into the kiln; conditions in the kiln destroy the absorptive properties of the coal, so that it can no longer absorb mercury. The demarcation between fine particles that travel with the gas stream and large-sized particles that instead enter the kiln depends on several variables, including velocity of the gas stream, conditions in the preheater cyclones, and so forth.

In some instances, the particulates, which include the pulverized coal, are recycled to the cement-making process. As part of the recycling, the pulverized coal returns to the preheater tower. Mercury absorbed by the pulverized coal will be released from the coal when the coal enters the preheater tower. The released mercury can be recaptured in the particulate collection device later.

Low levels of bromination have been observed to increase the mercury-removal performance of activated carbon sorbents; see in this regard U.S. Pat. No. 6,953,494. Preferably, an effective amount of a bromine-containing substance is brought into contact with the pulverized coal for a sufficient time to increase the ability of the pulverized coal to adsorb mercury and mercury-containing compounds. Injection of an amount of a bromine-containing substance to provide about 1 wt % of bromine on the pulverized coal is recommended, although injecting enough bromine-containing substance to provide about 5 wt % bromine to the pulverized coal is expected to yield better mercury absorption, and may be preferable. Injecting enough bromine-containing substance to provide about 15 wt % bromine to the pulverized coal is generally expected to produce an even more capable mercury sorbent, but there is a greater possibility that some amount of bromine may evolve from the pulverized coal under some circumstances. Greater degrees of bromination generally correlate with greater maximum mercury capacities for a particular sorbent. However, the optimum level of bromine-containing substance to combine with the pulverized coal varies with the particular situation.

Suitable bromine-containing substances include dissolved metal bromides, especially bromides of $K^+$, $Na^+$, or $NH_4^+$; hydrogen halide salts; elemental bromine, and hydrogen bromide. Preferred bromine-containing substances are elemental bromine ($Br_2$) and/or hydrogen bromide (HBr); preferably, the elemental bromine and/or hydrogen bromide are in gaseous form when brought into contact with the pulverized coal. Such contacting of the pulverized coal and a bromine-containing substance significantly increases the pulverized coal's ability to absorb mercury and mercury-containing compounds.

The contacting of the bromine-containing substance and the pulverized coal can occur at any point during or after the introduction of the pulverized coal.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. A method for reducing mercury emissions from a cement plant comprising at least a particulate collection device and a preheater tower comprised of one or more preheater cyclones, the method characterized by injecting pulverized coal into at least one preheater cyclone of said cement plant, wherein said injecting is into at least one preheater cyclone at temperature in range of about 400° C. to about 800° C.

2. A method as in claim 1 wherein said cement plant further comprises a coal baghouse, and wherein the pulverized coal is from the coal baghouse of said cement plant.

3. A method as in claim 1 wherein said pulverized coal is from a source external to said cement plant.

4. A method as in claim 1 wherein an effective amount of a bromine-containing substance is brought into contact with said pulverized coal for a sufficient time to increase the ability of the pulverized coal to adsorb mercury and mercury-containing compounds, with the proviso that when the bromine-containing substance is elemental bromine, the pulverized coal does not return to either the kiln or the preheater tower after said contact.

5. A method as in claim 4 wherein said bromine-containing substance is injected after the pulverized coal exits the kiln and before the particulate collection device.

6. A method as in claim 4 wherein said bromine-containing substance comprises elemental bromine and/or hydrogen bromide.

7. A method as in any of claims 1-6 further comprising injecting water with the pulverized coal.

8. A method as in any of claims 1-6 further comprising injecting water with the pulverized coal and wherein the pulverized coal is mixed with water, forming a mixture, which mixture is injected.

9. A method as in claim 1 wherein said pulverized coal has fine particulates, which fine particulates flow out of the preheater tower to a particulate collection device.

* * * * *